United States Patent
Noh

(10) Patent No.: US 8,242,679 B2
(45) Date of Patent: Aug. 14, 2012

(54) DISPLAY DEVICE USING QUANTUM DOT

(75) Inventor: Young Hoon Noh, Paju-si (KR)

(73) Assignee: LG Display Co., Ltd., Seoul (KR)

(\*) Notice: Subject to any disclaimer, the term of this patent is extended or adjusted under 35 U.S.C. 154(b) by 80 days.

(21) Appl. No.: 12/849,515

(22) Filed: Aug. 3, 2010

(65) Prior Publication Data

US 2011/0089809 A1 Apr. 21, 2011

(30) Foreign Application Priority Data

Oct. 16, 2009 (KR) .................. 10-2009-0098830

(51) Int. Cl.
*H01L 51/00* (2006.01)
(52) U.S. Cl. ....................... 313/483; 313/506
(58) Field of Classification Search .......... 313/498–512, 313/483
See application file for complete search history.

(56) References Cited

U.S. PATENT DOCUMENTS

2003/0066998 A1\* 4/2003 Lee .................................. 257/19
2010/0208172 A1\* 8/2010 Jang et al. ....................... 349/71

\* cited by examiner

*Primary Examiner* — Anne Hines
(74) *Attorney, Agent, or Firm* — McKenna Long & Aldridge, LLP

(57) ABSTRACT

A display device using quantum dots includes a first substrate and a second substrate disposed to face each other, a partition wall formed between the first and second substrates and defining a unit pixel, a first electrode formed on the first substrate, a second electrode formed to correspond to the first electrode, a backlight unit formed under the first substrate and having a UV light source, a UV blocking film formed above the second substrate, and a red light emitting layer where red quantum dots are formed, a blue light emitting layer where blue quantum dots are formed, and a green light emitting layer where green quantum dots are formed, which are disposed in the unit pixel.

21 Claims, 3 Drawing Sheets

DISPLAY DEVICE USING QUANTUM DOT

CROSS-REFERENCE TO RELATED APPLICATION

This application claims priority under 35 U.S.C. 119 to Korean Patent Application No. 10-2009-0098830, filed on Oct. 16, 2009, which is hereby incorporated by reference in its entirety.

BACKGROUND

1. Field of the Disclosure

This disclosure relates to a display device using quantum dots.

2. Description of the Related Art

Recently, with the rapid development in the field of information and communications, display devices for displaying various information have become more important. A cathode ray tube, one of the existing display devices, has a limit so that it may not comply with recent trends of being light and thin. As such, liquid crystal display (LCD) devices, plasma display panels (PDPs), or electroluminescence display (ELD) devices have been developed as flat panel display devices, and researches and developments thereon are actively carried out.

Among these display devices, the LCD device uses optical anisotropy and polarization properties of liquid crystal. Since the liquid crystal is thin and long, the arrangement of liquid crystal molecules has directivity. So, by applying an electric field to the liquid crystal, the directivity in the arrangement of liquid crystal molecules may be controlled.

Thus, by controlling the directivity in the arrangement of liquid crystal molecules, the arrangement of liquid crystal molecules changes so that light is refracted in the direction of the arrangement of liquid crystal molecules, thereby presenting an image.

However, such an LCD device has the following problems.

First, when a voltage is applied to the LCD device, the viewing angle of the liquid crystal molecules of the LCD device is decreased due to the index of refraction anisotropy.

Second, since the LCD is formed in a multilayer structure mainly including a thin film transistor (TFT) array substrate, a color filter substrate, a polarized panel, and a liquid crystal layer, an efficiency of light that passes through the bottom layer to the top layer decreases so that the LCD may have a low transmittance.

Third, since the TFT array substrate or the color filter substrate are formed by depositing and patterning various films, the manufacturing process the LCD device is very complicated.

Fourth, since the LCD device is configured to include various parts such as a backlight unit, liquid crystal, a color filter, and a polarized panel, it cost becomes higher.

BRIEF SUMMARY

Accordingly, the present embodiments are directed to a display device that substantially obviates one or more of problems due to the limitations and disadvantages of the related art.

An object of the present embodiments is to provide a display device employing quantum dots which may prevent narrowing of a viewing angle.

Another object of the present embodiments is to provide a display device employing quantum dots with a high transmittance.

Still another object of the present embodiments is to provide a display device employing quantum dots which are formed through a simple manufacturing process.

Further still another object of the present embodiments is to provide a display device employing quantum dots which is implemented at a low cost.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a display device using quantum dots includes a first substrate and a second substrate disposed to face each other, a partition wall formed between the first and second substrates and defining a unit pixel, a first electrode formed on the first substrate, a second electrode formed to correspond to the first electrode, a backlight unit formed under the first substrate and having a UV light source, a UV blocking film formed above the second substrate, and a red light emitting layer where red quantum dots are formed, a blue light emitting layer where blue quantum dots are formed, and a green light emitting layer where green quantum dots are formed, which are disposed in the unit pixel.

Each of the red quantum dots, blue quantum dots, and green quantum dots can include a core, a shell formed outside the core, and an organic ligand formed outside the shell. The shell is formed to have two separate portions.

The core is formed from any one selected from a material group which includes CdS, CdSe, CdTe, ZnS, ZnSe, ZnTe, GaAs, GaP, GaAs, GaSb, HgS, HgSe, HgTe, InAs, InP, InSb, AlAs, AlP, AlSb, and compounds thereof including at least 3 materials. The shell is formed from any one of SiO, TiO, ZnO, Silica, and MgO. Also, the organic ligand is formed from an organic compound including S, P, COOH, and $NH_4$.

The size of a red quantum dot is about 18-20 nm, the size of a blue quantum dot is about 6-8 nm, and the size of a green quantum dot is about 12-14 nm.

The second electrode is formed on either the first substrate where the first electrode is formed, or the second substrate that faces the first substrate where the first electrode is formed. The UV light source emits UV light having a wavelength at 350-400 nm.

The red quantum dots, the green quantum dots, and the blue quantum dots are moved according to a difference in voltages applied to the first electrode and the second electrode.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
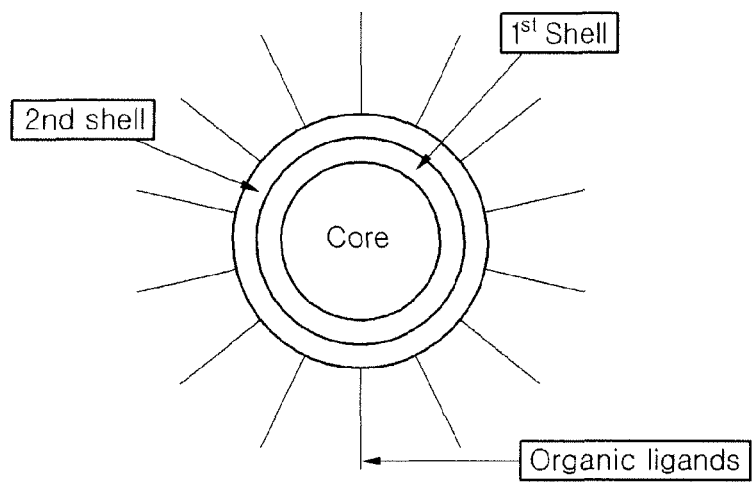
FIG. 1 illustrates the structure of a quantum dot according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

The present disclosure relates to a display device using quantum dots which are converted to various colors including red, green, and blue colors according to the size and composition thereof. Prior to the description about the structure of the display device of the present disclosure, a quantum dot used in the present disclosure will be first described.

First, a nano particle, that is, a nanocrystal, referred to as a quantum dot (QD), is a semiconductor structure having a size in units of nanometers. Unlike a quantum wire in one dimension, the QD has a structure of a zero dimension. That is, the QD denotes a particle that uses, as information, the existence or non-existence of a particle such as an electron confined in a space of a zero dimension. The diameter of the QD is within a range of 2-20 nm, and may be converted to various colors including red, green, and blue colors according to the size of the QD.

The QD, as shown in FIG. 1, has a structure of a core, a first shell, a second shell, and organic ligands. The core is formed of nanocrystal having semiconductor properties and constituted by II-VI groups or III-V groups in the periodic table. The core has a particular bandgap according to the composition and size thereof and thus absorbs light and emits light of an innate wavelength. For example, the core is formed from a compound such as one of CdS, CdSe, CdTe, ZnS, ZnSe, ZnTe, GaAs, GaP, GaAs, GaSb, HgS, HgSe, HgTe, InAs, InP, InSb, AlAs, AlP, AlSb, and compounds including 3 or 4 of the above materials. The first shell is a passivation film to maintain the semiconductor properties by preventing a chemical modification of the core. The first shell in formed to include an inorganic compound including oxygen such as SiO, TiO, ZnO, Silica, or MgO, which has insulation properties from the ingredient of the core. The second shell is a charging layer to provide electrophoresis properties to the QD, and is formed from an inorganic compound including oxygen such as SiO, TiO, ZnO, Silica, or MgO, which has insulation properties from the ingredient of the core. The shell may be formed of the first and second shells as described above, or a single shell. To minimize a lattice mismatch effect due to different ingredient formation between the core and the shell, the ingredient of the core and the ingredient of the shell are formed at a gradual concentration.

The organic ligand is formed of an organic compound including S, P, COOH, and $NH_4$, which prevents cohesion of the QDs and is coupled to a surface of the QD, as an organic layer providing charging properties. In detail, an organic compound such as $S(CH_2)_n COOH$, $PH(CH_2)nCOOH$, $S(CH2)nCHNH_2$, $PH(CH2)nCHNH_2$, $S(CH_2)n(C_6H_4)m$, or $PH(CH2)n(C_6H_4)m$ is used for the organic ligand.

The QD having the above structure may be implemented to be a red QD, a blue QD, or a green QD according to its size. That is, the size (or diameter) of a red QD is about 18-20 nm, the size of a green QD is about 12-14 nm, and the size of a blue QD is about 6-8 nm.

The red QD, blue QD, and green QD formed as above absorb emitted UV and emit red light, blue light, and green light, respectively. That is, when UV of a wavelength at about 350-400 nm is emitted to the red QD, blue QD, and green QD and an absorption wavelength is about 350-400 nm, blue light of center wavelength at 530 nm, blue light of center wavelength at 480 nm, and red light of center wavelength at 600 nm are emitted.

Figure 2:
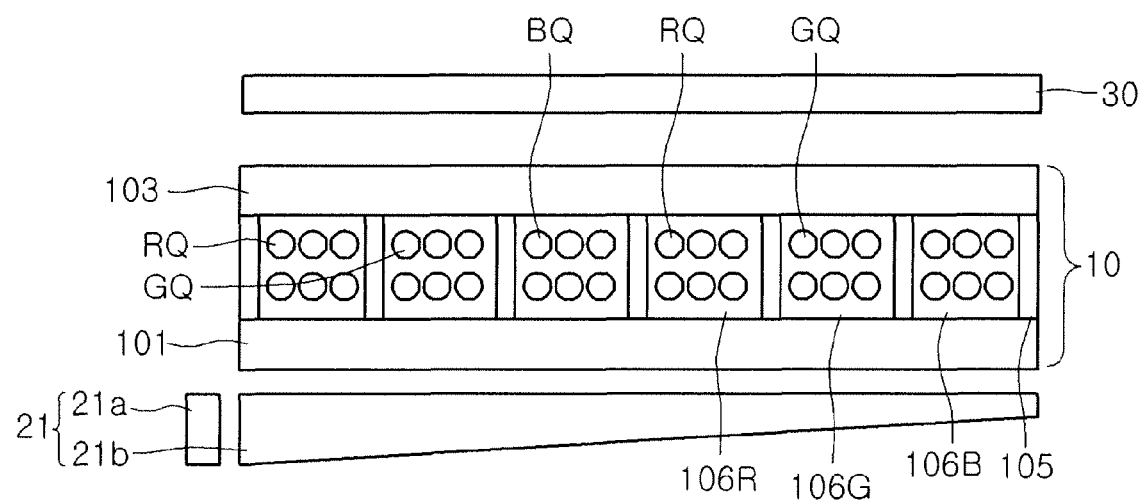
FIG. 2 is a cross-sectional view of a display device using quantum dots according to an embodiment of the present disclosure.

Next, the above-described display device using QDs will be now described in detail. FIG. 2 is a cross-sectional view of a display device using QDs according to an embodiment of the present disclosure.

Referring to FIG. 2, the display device using QDs includes a display panel 10, a backlight unit 21 disposed under the display panel 10 and providing UV to the display panel 10, and a UV blocking film 30 disposed above the display panel 10 and blocking UV emitted from the backlight unit 21 and passing through the display panel 10.

The backlight unit 21 includes a ramp portion 21a having a plurality of UV ramps as a light source and a light guiding and diffusing member 21b. The UV ramps of the ramp portion 21a emit UV of a wavelength at 350-400 nm. The light guiding and diffusing member 21b propagates the light from the UV ramps toward the rear surface of the display panel 10 and also diffuses the light to be uniformly distributed.

A ramp portion may be of a direct type or an edge type. According to the present disclosure, the ramp portion 21a may be of an edge type in which the UV ramps are arranged at one side of the light guiding and diffusing member 21b, or a direct type in which the UV ramps are arranged over the overall rear surface of the light guiding and diffusing member 21b. In the present embodiment of FIG. 2, the edge type is employed, but the direct type may be employed as well.

The display panel 10 includes a first substrate 101 and a second substrate 103 which are separated a predetermined distance from each other, a partition wall 105 disposed between the first and second substrates 101 and 103 and defining a unit pixel, a red light emitting layer 106R in which red quantum dots (RQs) are formed, a blue light emitting layer 106B in which blue quantum dots (BQs) are formed, and a green light emitting layer 106G in which green quantum dots (GQs) are foamed. The red, blue, and green light emitting layers 106R, 106B, and 106G are formed in each unit pixel. As the red, blue, and green light emitting layers 106R, 106B, and 106G are formed within each unit pixel, a variety of colors can be displayed at a unit pixel. As such, the display panel 10 can realize a variety of color images.

A first driving electrode (not shown) is formed on the first substrate 101. A second driving electrode (not shown) corresponding to the first driving electrode may be formed on the first substrate 101 or on the second substrate 103 that faces the first substrate 101. This will be detailed below in the description on a driving method. The first driving electrode may be formed of ITO or IZO as a transparent electrode, whereas the second driving electrode may be formed of Mo, Cr, Cu, or Al as an opaque electrode.

The UV blocking film 30 blocks UV emitted by the backlight unit 21 and passing through the display panel 10, and is formed of polyester as a main ingredient and includes polymers for absorbing and blocking UV.

The red QDs, blue QDs, and green QDs formed as above absorb the emitted UV and emit red light, blue light, and green light, respectively.

Since the display device using QDs configured as above uses the red QDs, blue QDs, and green QDs instead of liquid crystal molecules, a phenomenon that a viewing angle is decreased due to the index of refraction anisotropy may be prevented.

The display device using QDs according to the present disclosure does not use a color filter substrate or a polarized panel. As such, an efficiency of light passing from the bottom layer to the top layer is quite superior to an LCD so that a high transmittance may be obtained.

Also, the display device using QDs according to the present disclosure produces a color using the red QDs, blue QDs, and green QDs without forming a color filter substrate. Therefore, the manufacturing process of the above display device is simplified compared to that of the LCD device.

Furthermore, the display device using QDs according to the present disclosure does not use liquid crystal, a color filter, or a polarized panel, and the QD may be formed at a low cost. In view of these points, the manufacturing cost of the display device is lowered compared to that of the LCD device.

The display device using QDs according to the present disclosure may form respective colors as the QDs having charging properties move due to a voltage difference between the first driving electrode and the second driving electrode. A driving mode of the display device using QDs according to the present disclosure will be described in detail with reference to the accompanying drawings.

Figure 3A:
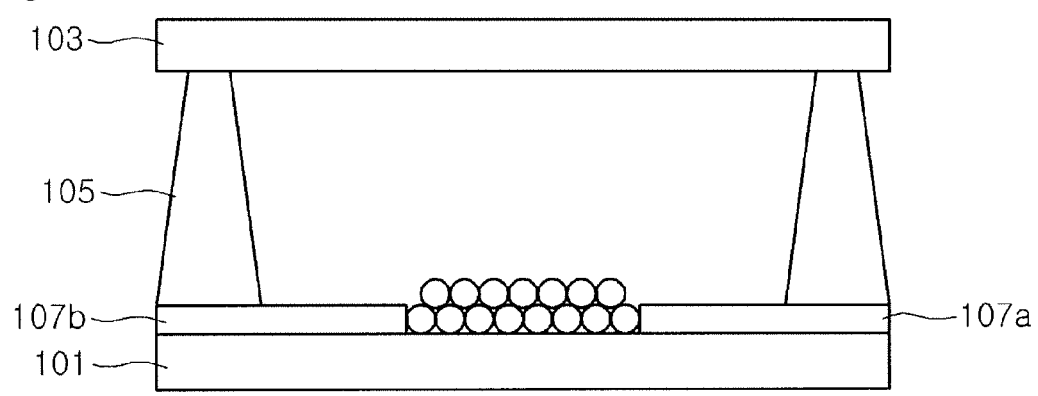
FIGS. 3A and 3B are views illustrating a unit pixel of a display panel in which a first driving electrode and a second driving electrode are formed on a first substrate.
Figure 3B:
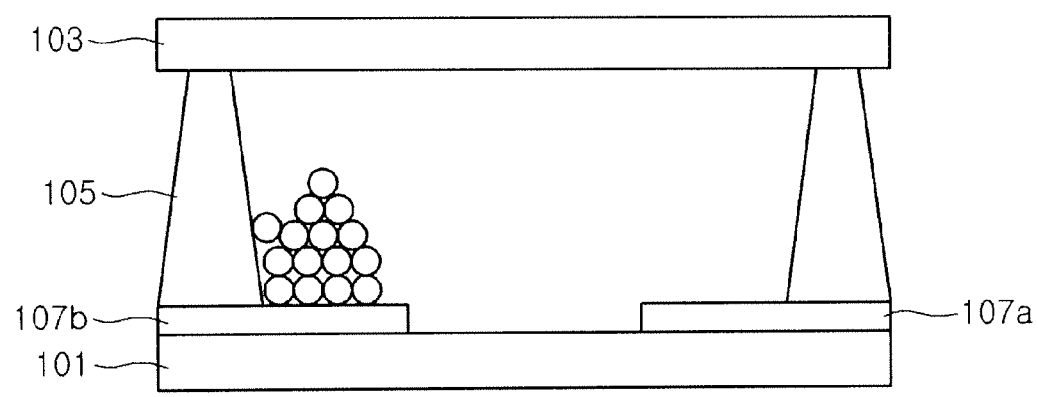
Figure 4A:
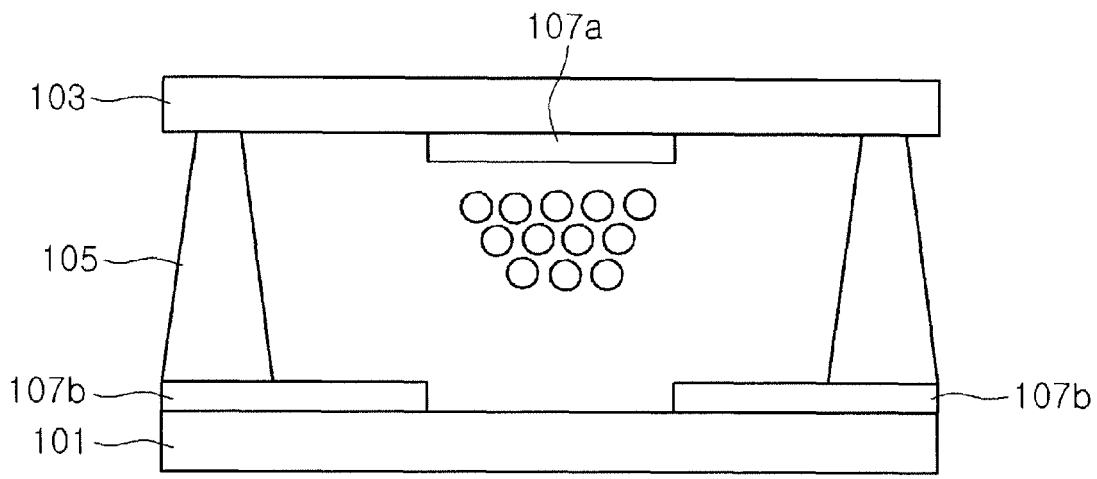
FIGS. 4A and 4B are views illustrating a unit pixel of a display panel in which a first driving electrode is formed on a first substrate and a second driving electrode is formed on a second substrate.
Figure 4B:
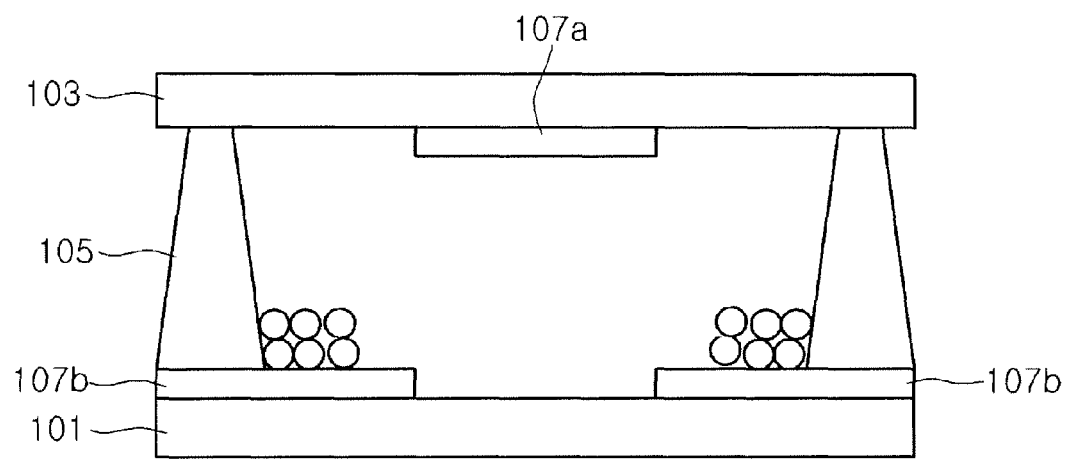

FIGS. 3A and 3B are views illustrating a unit pixel of a display panel in which a first driving electrode and a second driving electrode are formed on the first substrate 101. FIGS. 4A and 4B are views illustrating a unit pixel of a display panel in which a first driving electrode is formed on the first substrate 101 and a second driving electrode is formed on the second substrate 103. In the following description, the unit pixel is defined as one in which a red light emitting layer is formed.

First, the driving of a display panel in which a first driving electrode 107a and a second driving electrode 107b are formed on the first substrate 101 by neighboring each other is described below. Referring to FIG. 3A, when the same voltage, that is, 0 V, is applied to each of the first driving electrode 107a and the second driving electrode 107b, RQs are moved and distributed between the first driving electrode 107a and the second driving electrode 107b. The RQs absorb UV light emitted from the backlight unit 21 of FIG. 2 formed under the first substrate 101 and emit red light. Likewise, the unit pixel where BQs are formed and the unit pixel where GQs are formed, respectively, emit blue light and green light in the same principle.

Also, referring to FIG. 3B, when a voltage higher than that applied to the first driving electrode 107a is applied to the second driving electrode 107b, for example, 5 V is applied to the second driving electrode 107b while 0 V is applied to the first driving electrode 107a, the RQs are moved and distributed on and above the second driving voltage 107b to which a higher voltage is applied. In this state, the UV light emitted from the backlight unit 21 of FIG. 2 formed under the first substrate 101 arrives at the second substrate 107b without a change and thus red light is not formed. Likewise, neither the unit pixel where BQs are formed nor the unit pixel where GQs are formed emits blue light or green light in the same principle.

Next, the driving of a display panel in which the first driving electrode 107a and the second driving electrode 107b are respectively formed on the first substrate 101 and the second substrate 103 is described below. Referring to FIG. 4A, when the same voltage, that is, 0 V, is applied to each of the first driving electrode 107a and the second driving electrode 107b, RQs are moved and distributed between the first driving electrode 107a and the second driving electrode 107b. Then, the RQs absorb UV light emitted from the backlight unit 21 of FIG. 2 formed under the first substrate 101 and emit red light. Likewise, the unit pixel where BQs are formed and the unit pixel where GQs are formed, respectively, emit blue light and green light in the same principle.

Also, referring to FIG. 4B, when a voltage higher than that applied to the first driving electrode 107a is applied to the second driving electrode 107b, for example, 5 V is applied to the second driving electrode 107b while 0 V is applied to the first driving electrode 107a, the RQs are moved and distributed on and above the second driving voltage 107b to which a higher voltage is applied. In this state, the UV light emitted from the backlight unit 21 of FIG. 2 formed under the first substrate 101 arrives at the second substrate 107b without a change and thus red light is not formed. Likewise, neither the unit pixel where BQs are formed nor the unit pixel where GQs are formed forms blue light or green light in the same principle.

As described above, in the display device using QDs according to the present disclosure, since the QDs are moved according to a difference between the voltages applied to the first driving electrode and the second driving electrode, respective colors may be formed.

It will be apparent to those skilled in the art that various modifications and variations can be made in the present disclosure. Thus, it is intended that the present disclosure cover the modifications and variations of this embodiment provided they come within the scope of the appended claims and their equivalents.

What is claimed is:

1. A display device comprising:
   a backlight unit, emitting a UV light;
   a first substrate and a second substrate on the backlight unit;
   a plurality of partition walls between the first and second substrates, defining a plurality of sub-pixels;
   a plurality of Quantum Dot (QD) units disposed within the plurality of sub-pixels, and emitting a visible light while absorbing the UV light; and
   a first driving electrode and a second driving electrode disposed between the first substrate and the second substrate for controlling the QD units to selectively absorb the UV light according to the voltages applied to the first driving electrode and the second driving electrode.

2. The display device claimed as claim 1, further comprising:
   a UV blocking film disposed above the second substrate for blocking the UV light from passing therethrough.

3. The display device claimed as claim 1, wherein QD units are moved according to a difference in voltages applied to the first driving electrode and the second driving electrode.

4. The display device claimed as claim 1, wherein the second driving electrode blocks the UV light from directly irradiating the QD units when the QD units are controlled to be moved toward the second driving electrode.

5. The display device claimed as claim 1, wherein the UV light is directly irradiating the QD units when the QD units are controlled to be moved away from the second driving electrode.

6. The display device claimed as claim 1, wherein the first driving electrode and the second driving electrode are on the first substrate.

7. The display device claimed as claim 6, wherein the second driving electrode blocks the UV light from being irradiated the second driving electrode.

8. The display device claimed as claim 1, wherein the first driving electrode is on the second substrate, and the second driving electrode is on the first substrate.

9. The display device claimed as claim 8, wherein the first driving electrode is substantially transparent.

10. The display device claimed as claim 9, wherein the second driving electrode blocks the UV light.

11. The display device claimed as claim 1, wherein QD units comprise a plurality of quantum dots, and each of the quantum dots comprises:
a core;
a shell formed outside the core; and
an organic ligand formed outside the shell.

12. The display device claimed as claim 11, wherein the core is one or more material selected from a group which includes CdS, CdSe, CdTe, ZnS, ZnSe, ZnTe, GaAs, GaP, GaAs, GaSb, HgS, HgSe, HgTe, InAs, InP, InSb, AlAs, AlP, and AlSb.

13. The display device claimed as claim 11, wherein the shell is one or more material selected from a group including SiO, TiO, ZnO, Silica, and MgO.

14. The display device claimed as claim 11, wherein the organic ligand is made of an organic compound selected from a group including S, P, COOH, and NH4.

15. The display device claimed as claim 11, wherein the quantum dots comprise red quantum dots, and the size of the red quantum dots is about 18 to 20 nm.

16. The display device claimed as claim 11, wherein the quantum dots comprise green quantum dots, and the size of the green quantum dots is about 12 to 14 nm.

17. The display device claimed as claim 11, wherein the quantum dots comprise blue quantum dots, and the size of the blue quantum dots is about 6 to 8 nm.

18. The display device claimed as claim 11, wherein the quantum dots comprise red quantum dots, green quantum dots, and blue quantum dots.

19. The display device claimed as claim 1, wherein the QD units in one of the plurality of the sub-pixels comprise red quantum dots, green quantum dots, and blue quantum dots.

20. The display device claimed as claim 1, wherein a solvent is filled in space between the first substrate and the second substrate.

21. The display device claimed as claim 20, wherein the solvent is selected from water, toluene, chloroform, xylene or hexane.

* * * * *